May 16, 1961  R. S. WEBB  2,984,761
HYDRAULIC SERVO FEED
Filed March 16, 1960  3 Sheets-Sheet 1
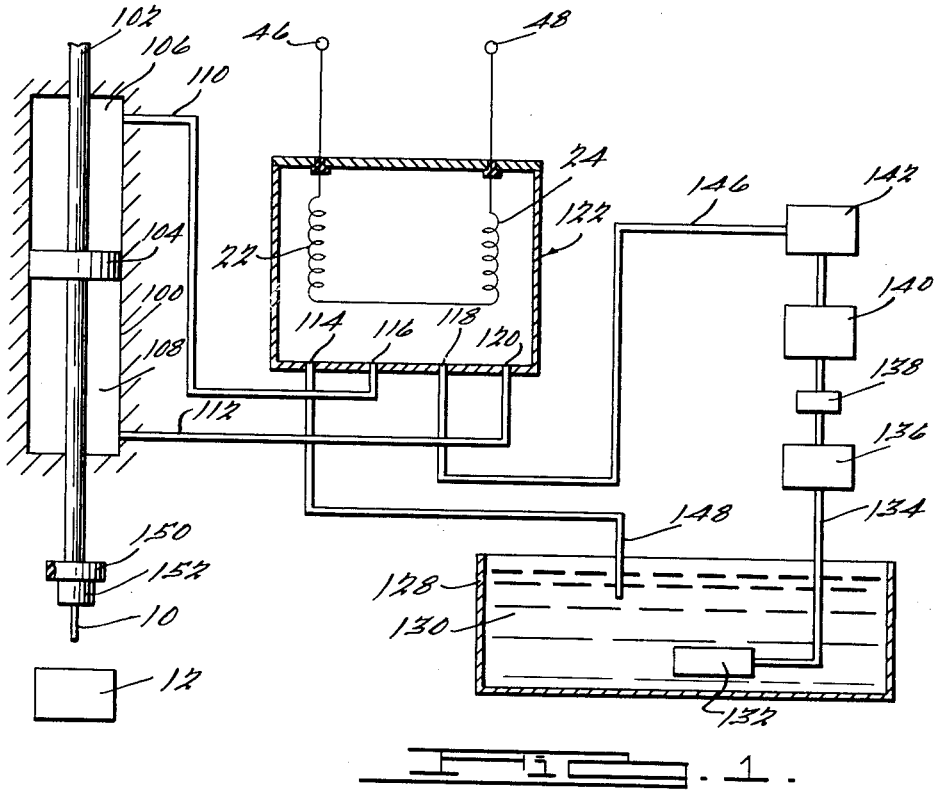
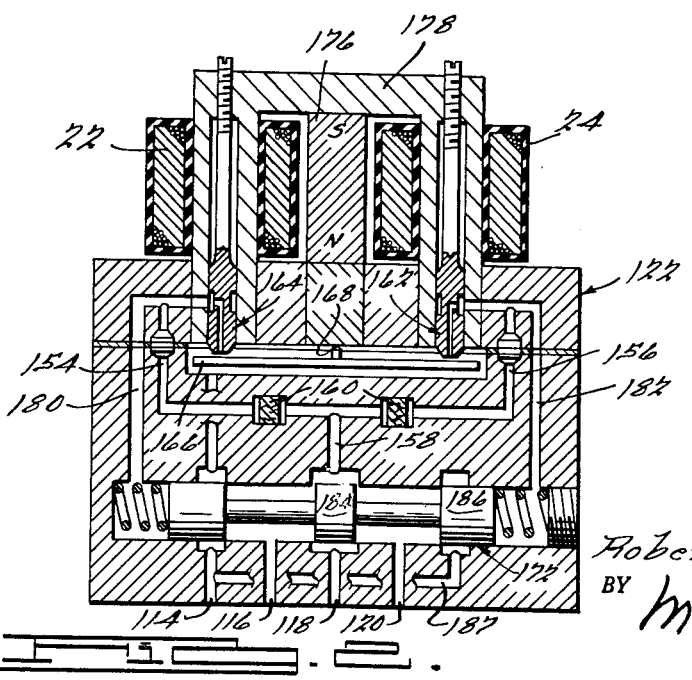
INVENTOR.
Robert S. Webb.
BY
ATTORNEY May 16, 1961 R. S. WEBB 2,984,761
HYDRAULIC SERVO FEED
Filed March 16, 1960 3 Sheets-Sheet 2
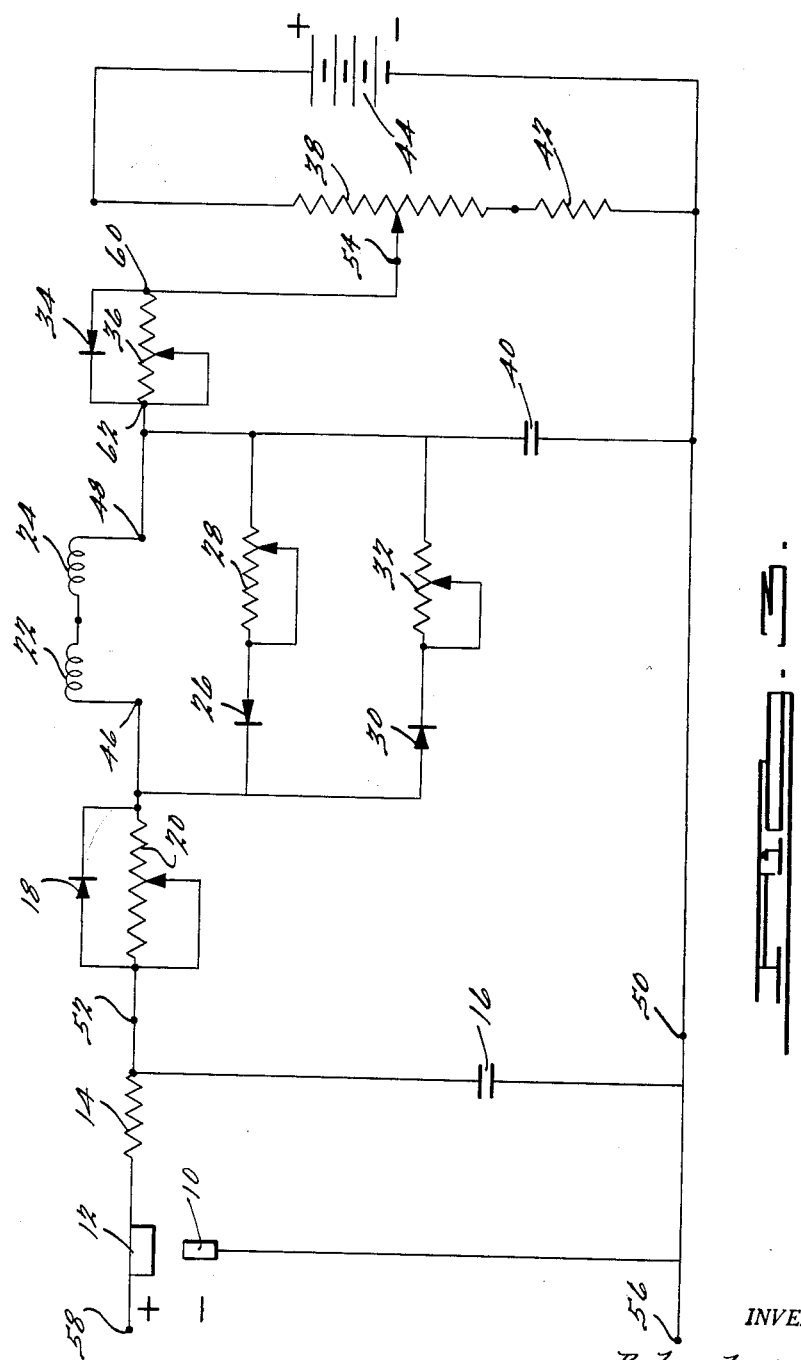
INVENTOR.
BY Robert S. Webb.
M K Murphy
ATTORNEY May 16, 1961  R. S. WEBB  2,984,761
HYDRAULIC SERVO FEED
Filed March 16, 1960  3 Sheets-Sheet 3
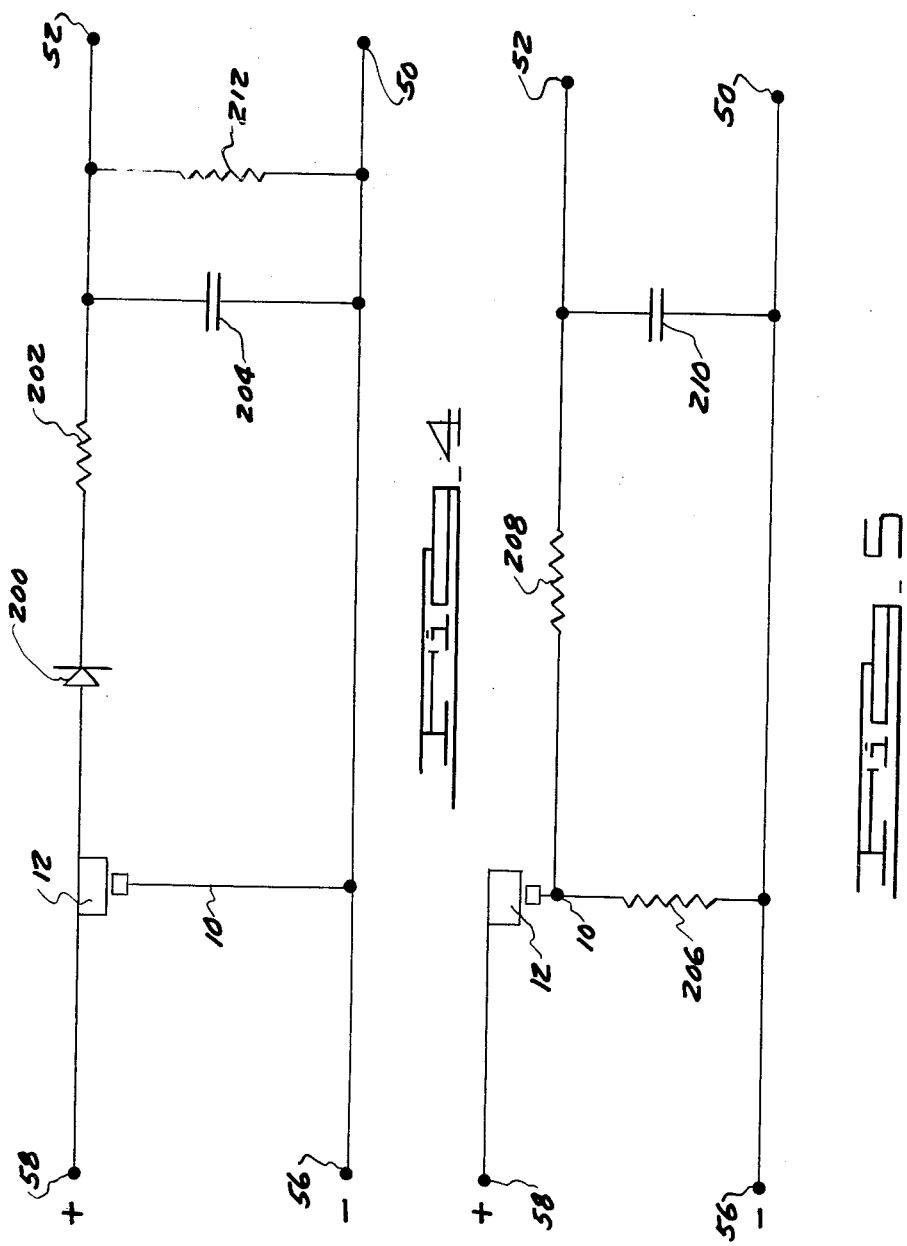
INVENTOR.
ROBERT S. WEBB
BY
ATTORNEY

United States Patent Office 2,984,761
Patented May 16, 1961

2,984,761

HYDRAULIC SERVO FEED

Robert S. Webb, Bloomfield Hills, Mich., assignor to Elox Corporation of Michigan, Troy Mich., a corporation of Michigan Filed Mar. 16, 1960, Ser. No. 15,505

8 Claims. (Cl. 314—61)

This invention relates to electrical discharge machining and particularly to improved power feed means for controlling the feeding of the machining electrode.

Application of electrical discharge machining, sometimes called E.D.M., to the machining of large workpieces has required considerable redesign of the feeding and positioning mechanism for the electrodes which have become increasingly heavy and bulky. Electro-hydraulic servo feeds now in common use, and a sensing circuit is used to monitor the position of the electrode with respect to the workpiece at all times and to sense conditions in the machining gap, thereby to cause advance or retraction of the electrode as the occasion demands.

The principal object of this invention is to provide a more reliable and less costly control "package" for the power feed of the E.D.M. apparatus.

Another object is to improve the operating characteristics of the power feed mechanism particularly with respect to tendency of the electrode to overtravel on downfeed and lag in recovery after backup, especially when heavy electrodes are involved.

Other objects and advantages will become apparent from the following specification which, in conjunction with the accompanying drawings, discloses a preferred form of the invention.

In the drawings, in which reference characters have been used to designate like parts referred to herein:

Fig. 1 is a schematic showing of a typical hydraulic power feed mechanism for an E.D.M. electrode;

Fig. 2 is a sectional view of one form of hydraulic control valve suitable for use in the Fig. 1 mechanism;

Fig. 3 is a schematic wiring circuit for automatic control of the power feed mechanism;

Fig. 4 is a schematic wiring diagram of a modified form of signal input which may be used in connection with the control circuit of Fig. 3; and Fig. 5 is a similar showing of another modification of the signal input.

Referring to Figs. 1 and 2, it will be seen I have shown a machining electrode 10 disposed in spaced relationship to a workpiece 12. The electrode 10 may weight a few ounces or several hundred pounds and may be of almost any shape depending upon the hole or cavity to be machined. It is held in a collet 152 carried by an insulating plate 150. The latter is carried by a piston rod 102 attached to piston 104 which is reciprocable in a cylinder 100. The cylinder is rigidly mounted on the column of the E.D.M. apparatus (not shown), and fluid flow to and from the cylinder is regulated by a valve generally designated by numeral 122 and shown in detail in Fig. 2.

The fluid circuit comprises a reservoir 128 which contains fluid 130. The fluid is drawn through screen 132 through input suction line 134 by pump 136. The pump, which operates in a range of from 500 to 3000 p.s.i., forces the fluid through check valve 138 and filter 140 to accumulator 142, which stores hydraulic pressure and eliminates surging. Pressure line 146 connects with input port 118 of valve 122. The hydraulic circuit is completed by the valve through the cylinder 100 and fluid is exhausted through valve exhaust port 114 into line 148 which leads to the reservoir 128.

As may be seen in Figs. 1 and 2, the valves 122 has a pair of electrically energizable coils 22, 24, which may be connected in series, parallel or in "push-pull," it being necessary only to correctly phase the coils such that the desired operation is obtained with a reversal of polarity across them. In this instance, the coils are connected in series.

The valve 122 is a two-stage valve and embodies a sensitive first stage and a second stage which is operable in response to operation of the quickly responsive first stage. In other words, the valve is an amplifying valve which applies relatively high fluid pressures to the cylinder 100 in response to relatively low differential pressures developed in the first stage.

The first or electrically operated stage is controlled by the flapper 166. This flapper is pivotally mounted at 168 and its position is governed by permanent magnet 176 and by the coils 22 and 24 which add or subtract flux in accordance with the energization thereof.

The lands of the valve spool 172 are so proportioned that in the null condition illustrated, sufficient clearance is provided such that a leakage flow of from 10% to 20% of normal flow is permitted through the valve. That is to say, fluid flows through pressure port 118, around portion 184, through passage 158, filters 160, passages 154 and 156 to nozzles 162, 164. Passages 180, 182, and ports 116, 120, are open to this flow, but inasmuch as the valve is balanced, no action results.

Energization of coils 22, 24, in one direction or the other will cause flapper 166 to be attracted toward nozzle 162 or 164, and control action of the valve will be initiated. Let it be assumed that the flapper 166 is attracted toward nozzle 164 and away from 162, this corresponding to downfeed of electrode 10. As flapper 166 moves toward nozzle 164, increased pressure is developed in passage 180, and pressure is reduced in passage 182. Valve spool 172 is thereby moved to the right. This exposes port 116 to full system pressure through port 118 and port 120 is opened to exhaust 114 by movement of land 186 to uncover passage 187. Thus pressure is increased at port 116 and reduced at port 120 and piston 104 will downfeed electrode 10.

When electrode backup or retraction is signalled by the sensing circuit described below, coils 22, 24, are oppositely polarized and opposite movement of flapper 166 causes increased pressure on port 120 and exhaust on port 116.

Other types of two stage valves may be used. Two commercially obtainable valves which work satisfactorily are Vickers model A–13051 and Pegasus model 120G.

Reference is now made to Fig. 3 which shows the control circuit for coils 22, 24. In Fig. 3, the electrode 10 and workpiece 12 are connected across an E.D.M. supply of direct current voltage represented by terminals 56, 58. The power supply is assumed to be adequate to supply the necessary voltage for causing discharge across the gap between the electrode and workpiece in accordance with the characteristic of the power control circuit. A preferred form of power supply is shown and described in my copending application Serial No. 747,078, filed July 7, 1958.

A sensing network comprising a resistor 14 and a condenser 16 is connected across the machining gap. This is a standard sensing network which presents at terminals 50, 52, the average voltage prevailing across the gap.

The terminal 50 is, in this instance, connected to the negative side of a reference voltage source 44. The terminal 52 is connected through a potentiometer 20 to valve coil terminal 46. The potentiometer 20 is shunted by a diode 18 for a purpose to be described.

The reference voltage 44 is connected in parallel with a potentiometer 38, a limiting resistor 42 being connected in series. The latter is included because operation of this circuit at voltages below 20 volts is unsatisfactory in most instances.

Valve control coils 22, 24, are connected in series between terminals 46, 48, and the latter is connected through a potentiometer 36 with terminal 54 which is the adjustable voltage terminal of the potentiometer 38. The potentiometer 36 is shunted by a diode 34.

A potentiometer 28 is series connected with a diode 26 across the terminals 46, 48, and a parallel potentiometer-diode combination 32, 30, is similarly connected, the diode 30 being of oppositely polarity to the diode 26. The circuit is completed by the condenser 40 which connects the terminal 48 with terminal 50.

In this circuit, the difference in voltage between terminal 52 which measures the average input voltage at the working gap, and terminal 54 which measures the preset balance reference voltage, is presented to the coils 22, 24, for controlling the electrode position. Actually, potentiometers 20, 36 and 38 are "ganged" together to form the gap reference voltage.

As an example of the operation of the device, consider a condition wherein the voltage at point 52 is in excess of that at point 54. Electron flow then will be from point 54, through potentiometer 36 (diode 34 blocking shunt flow), coils 24, 22, and diode 18 to averaging sensing network 14, 16. This will cause operation of valve 122 to downfeed the electrode 10 as explained above. Potentiometer 36 limits electron flow from terminal 54 to terminal 52, potentiometer 20 being shorted by diode 18 during this phase of electron flow. During this phase potentiometer 32 and diode 30 are in shunt with coils 22, 24; thus the setting of potentiometer 32 determines the level of excitation of the coils and the velocity of the downfeed of the electrode.

When the electrode 10 reaches predetermined gap setting, a null condition is established, voltage at 52 equals voltage at 54 and no current flows.

Backup of the electrode is initiated when the voltage at 52 is lower than that at 54, whereupon electron flow, blocked by diode 18, is through potentiometer 20, valve control coils 22, 24, and diode 34 to adjusting terminal 54 of potentiometer 38. Additionally, there is shunt flow through diode 26 and potentiometer 28, which constitute the backup velocity control.

In a circuit like that just described, it is imperative that some kind of voltage limiting device be provided for the electrode servo. A typical voltage rating for the series valve coils 22, 24, is 5 volts each or 10 volts total. In a typical E.D.M. machine, reference voltage 44 and average gap input voltage stored in condenser 16 will range between 20 and 80 volts for precision equipment and between zero and two or three hundred volts in equipment employing relaxation oscillator circuits.

For example, assume that in the operation of the above decribed circuit, a short circuit between the electrode and workpiece occurs with the reference point 54 set at 80 volts. There will be then, zero volts across the gap and the full difference of potential, i.e. 80 volts would appear across the coils 22, 24, unless the potentiometers 20 and 38 were in the circuit. Under open circuit conditions, the potentiometer 36 functions in conjunction with potentiometer 38 in a similar manner.

With heavy electrodes, the inertia of the power feed servo components becomes important and overtravel of the piston 104, particularly when advancing downwardly, is common unless some means to prevent this is used. The condenser 40 serves to substantially reduce, and in some instances eliminate this overtravel. During a condition of electrode downfeed, electron flow is from terminal 54 through potentiometer 36 to coils 22, 24. Thus there is a voltage drop across the potentiometer resistor 36 and the condenser 40 will store the sum of this voltage and the voltage existing at point 54. Accordingly, for the period of decay of the voltage stored in the condenser, a higher than normal reference voltage is effective at point 62 in the circuit. This decaying higher reference voltage causes the gap voltage to be momentarily higher than the preset normal gap voltage and the effect is to slow downfeed of the electrode and prevent overtravel which might lead to hunting.

Experience has indicated that for optimum performance, condenser capacity should be chosen such that the time discharge constant will be slightly greater than the mechanical or backlash constant of the machine elements involved. The condenser improves performance of the circuit on backup also, provided that the condenser time constant is not in excess of twenty times that of the machine inertia constant. During backup of the electrode, diode 34 shorts out potentiometer 36, and terminal 62 and condenser 40 remain for an appreciable period at the potential of point 54, thus permitting quick recovery after a condition of short circuit.

It will be seen that proper selection of capacity of condenser 40 provides a "gentling" of electrode movement on downfeed and rapid recovery after backup.

The control circuit of Fig. 3 is adapted to be used with other types of sensing networks. One example is shown in Fig. 4 in which diode 200 and condenser 204 replace the RC network 14—16 of Fig. 3. In this circuit, the peak gap voltage or striking voltage is stored across condenser 204, instead of the average gap voltage. Resistor 202 is optional as a current surge limiting resistor for diode 200. In any case, the resistor 202 would be much smaller in value than resistor 14 for a network of corresponding capacity.

In the Fig. 4 circuit, the charge on condenser 204 is blocked from the gap by diode 200 and resistor 212 serves to discharge condenser 204 as well as a return for back-up current flowing from voltage source 44 of the power feed control circuit.

Fig. 5 shows another form of gap power input sensing network which senses curent flowing in the gap circuit. In this instance, signal resistor 206 is connected in series with the machining gap, and as current flows in the gap circuit, a voltage drop occurs across resistor 206 which is sensed by the RC network 208—210. This RC network is generally of the same magnitude and capacity as the network 14—16 of Fig. 3. Resistor 206 is, of course, of relatively low impedance since the gap loop is subject to heavy current flow.

Thus it can be seen that the basic form of simplified power feed control circuit may be applied to any type of input sensing network. The novelty in each of these cases is the vastly simplified control network in which inexpensive and rugged devices are substituted for normal control components such as vacuum tubes, thyratrons, transistors or other electronic three terminal elements. This novel control circuit is characterized by an extremely low cost of construction as well as long life since no components are of the emission type. The heart of the circuit itself consists of four potentiometers, four diodes, and one condenser, which is fantastically less than other forms of circuitry used to achieve similar results.

If commercially available non-linear potentiometers are used at 28 and 32, excellent control results since voltage magnitudes at terminals 46, 48, depend upon the setting of these potentiometers for either Up or Down velocity. A uniform rotation of either potentiometer will produce a linear reduction in voltage at terminals 46, 48, for the potentiometer corresponding to either Up or Down velocity. In other words, at a mid-point setting of the potentiometer, approximately 50% of the voltage and therefore 50% of the speed setting would exist. This provides excellent machine control.

While I have shown and described the operation of my improved feed control circuit in conjunction with a hydraulically actuated power feed, it is applicable as well to control of an electric motor driven feed system. With an electrically driven feed mechanism, the circuit components would have to be of much heavier wattage capacity, but equally good control may be achieved.

I claim:

1. In combination with electrical discharge machining equipment having means for passing current across a gap between an electrode and a workpiece for eroding the workpiece, servo means for controlling the gap spacing of the electrode and workpiece comprising reversible motive means, an electrically energized element for controlling operation of said motive means, circuit means connected with said gap and said element operable to cause operation of said motive means in response to changes in gap voltage above or below preset machining voltage comprising, a network for sensing and storing gap voltage, a first potentiometer connected in series with said network and said element, a diode shunted across said first potentiometer permitting electron flow around said first potentiometer from said element to said network, a reference voltage source, a second potentiometer connected in series with said reference voltage and said element, and a diode shunted across said second potentiometer in opposite polarity relationship with respect to said first mentioned diode permitting electron flow around said second potentiometer from said element to said reference voltage.

2. The combination set forth in claim 1 including a variable resistor and diode in series connected in shunt around said element for shunting a portion of the electron flow during electrode backup.

3. The combination set forth in claim 1 including a variable resistor and diode in series connected in shunt around said element for shunting a portion of the electron flow during electrode downfeed.

4. The combination set forth in claim 1 including a condenser connected in series with said reference voltage and said second potentiometer operable to momentarily store the sum of the voltages across said components during electrode downfeed.

5. In combination with electrical discharge machining equipment having means for passing current across a gap between an electrode and a workpiece for eroding the workpiece, servo means for controlling the gap spacing of the electrode and workpiece comprising reversible motive means, an electrically energized element for controlling operation of said motive means, circuit means connected with said gap and said element operable to cause operation of said motive means in response to changes in gap voltage above or below preset machining voltage comprising, a network for sensing changes in current flow in the gap, a first potentiometer connected in series with said network and said element, a diode shunted across said first potentiometer permitting electron flow around said first potentiometer from said element to said network, a reference voltage source, a second potentiometer connected in series with said reference voltage and said element, and a diode shunted across said second potentiometer in opposite polarity relationship with respect to said first mentioned diode permitting electron flow around said second potentiometer from said element to said reference voltage.

6. The combination set forth in claim 5 including a variable resistor and diode in series connected in shunt around said element for shunting a portion of the electron flow during electrode backup.

7. The combination set forth in claim 5 including a variable resistor and diode in series connected in shunt around said element for shunting a portion of the electron flow during electrode downfeed.

8. The combination set forth in claim 5 including a condenser connected in series with said reference voltage and said second potentiometer operable to momentarily store the sum of the voltages across said components during electrode downfeed.

No references cited.